(12) United States Patent
Hsiao et al.

(10) Patent No.: US 7,023,660 B2
(45) Date of Patent: Apr. 4, 2006

(54) LOCALIZED POLE TIP HEATING DEVICE FOR MAGNETIC HEAD FOR HARD DISK DRIVE

(75) Inventors: Wen-Chien David Hsiao, San Jose, CA (US); Quan-Chiu Harry Lam, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 282 days.

(21) Appl. No.: 10/624,656

(22) Filed: Jul. 21, 2003

(65) Prior Publication Data

US 2005/0018347 A1 Jan. 27, 2005

(51) Int. Cl.
*G11B 5/147* (2006.01)

(52) U.S. Cl. .................... 360/128; 360/123; 360/126
(58) Field of Classification Search .............. 360/128, 360/123, 126, 125
See application file for complete search history.

(56) References Cited

U.S. PATENT DOCUMENTS

| | | | |
|---|---|---|---|
| 5,025,341 A | 6/1991 | Bousquet et al. | 360/120 |
| 6,493,183 B1 * | 12/2002 | Kasiraj et al. | 360/126 |
| 6,614,107 B1 * | 9/2003 | Inoue et al. | 257/706 |
| 2004/0240109 A1 * | 12/2004 | Hamann et al. | 360/126 |

FOREIGN PATENT DOCUMENTS

| | | |
|---|---|---|
| DE | 3418822 A1 | 11/1985 |
| JP | 54103008 A | 8/1979 |
| JP | 54103009 A | 8/1979 |
| JP | 61105709 A | 5/1986 |
| JP | 1199311 A | 8/1989 |
| JP | 2206010 A | 8/1990 |
| JP | 2042611 A | 6/1991 |
| JP | 4305809 A | 10/1992 |
| JP | 2002056512 A | 2/2002 |

* cited by examiner

*Primary Examiner*—Robert S. Tupper
(74) *Attorney, Agent, or Firm*—Robert O. Guillot; Intellectual Property Law Offices

(57) ABSTRACT

The magnetic head is formed with a narrow pole tip, and a pole tip heating element is fabricated to reduce the pole tip stress and increase its permeability, such that the magnetization switching speed of the pole tip is increased. The heating element is preferably electrically interconnected within the induction coil circuit of the magnetic head, such that the electrical current flowing through the induction coil also flows through the heating element. In a preferred embodiment, the heating element is fabricated above the second magnetic pole. The heating element is preferably formed with a resistance of approximately 0.2 to 1.0 ohms, such that the approximately 40 mA current that flows through the induction coil and the heating element creates a heating energy of the heating element of approximately 0.3 to 1.6 mW. The heating element can be comprised of a variety of materials such as Cu, W, NiFe, NiCr and IrRh.

16 Claims, 5 Drawing Sheets

LOCALIZED POLE TIP HEATING DEVICE FOR MAGNETIC HEAD FOR HARD DISK DRIVE

BACKGROUND OF THE INVENTION

1. Field of the Invention

The present invention relates generally to magnetic heads for hard disk drives, and more particularly to a heating device for the localized heating of the pole tip of the magnetic head.

2. Description of the Prior Art

The continual quest to increase the areal data storage density of magnetic media has resulted in the reduction in the width of the writing head magnetic pole tip of the magnetic head, such that a narrower track width is created and more tracks per inch (TPI) can be recorded in the media. Simultaneously, there is the quest to increase the data rate at which data bits are written to the magnetic media. State of the art pole tips are currently created having a pole tip width of approximately 0.25 microns in response to the desire to increase TPI, and data rates are approaching 1 Gb/second. A problem that arises when such narrow pole tips are driven at such high data rates is that rapid magnetic domain switching within the narrow pole tip at such data rates has become difficult to obtain. Experimental evidence shows that the magnetization of such a narrow pole tip is switching at a much slower rate than that of the much wider yoke behind the pole tip, and it appears that for such very narrow pole tips at these high data rate frequencies that the pole tip is no longer acting as a soft magnet, but almost as a tiny hard magnet, with its magnetization being switched back and forth (rather than rotating) to accomplish the high data rate writing.

The sluggishness of the pole tip switching appears to be due, in part, to its small dimensions, which are approaching the dimensions of magnetic domains within the pole tip, as well as the high local stress levels within the pole tip. The small sub-domain dimensions reduce the local permeability of the pole tip through stress-induced anisotropy, and through the relatively slow domain wall motion involved in the switching action. There is therefore a need to increase the permeability and reduce the stress of the narrow pole tip, such that magnetic flux will flow more rapidly through it and the magnetization switching rate of the pole tip can be increased.

SUMMARY OF THE INVENTION

The magnetic head of the present invention is formed with a narrow pole tip, such that the track width that is written on the magnetic media of the hard disk drive is correspondingly narrow. However, such narrow pole tips have decreased magnetization switching speeds that result in decreased data writing rates. In the present invention a pole tip heating element is fabricated to reduce the pole tip stress and increase its permeability, such that the magnetization switching speed is increased. The heating element is preferably electrically interconnected within the induction coil circuit of the magnetic head, such that the electrical current flowing through the induction coil also flows through the heating element. In the preferred embodiment, the heating element is electrically connected in series with the induction coil. In this electrically connected configuration there is no increase in the number of electrical leads to the magnetic head, as the heating element receives its electrical current through the existing two electrical connections for the induction coil. In a preferred embodiment, the heating element is fabricated above the second magnetic pole, such that the fabrication steps for forming the heating element do not interfere with the preexisting process steps for fabricating the major components of the head. The heating element may have a resistance of from 0.2 to 1.0 ohms, and is preferably formed with a resistance of approximately 0.3 to 0.6 ohms, such that the approximately 40 mA current that flows through the induction coil and the heating element creates a heating energy of the heating element of approximately 0.5 mW. The heating element can be comprised of a variety of materials such as Cu, W, NiFe, NiCr and IrRh.

It is an advantage of the magnetic head of the present invention that higher data writing rates utilizing a narrow pole tip are achieved.

It is another advantage of the magnetic head of the present invention that it includes a narrow pole tip having an increased permeability.

It is a further advantage of the magnetic head of the present invention that it includes a pole tip having lower stress.

It is yet another advantage of the magnetic head of the present invention that it includes a heating element for the pole tip of the magnetic head.

It is yet a further advantage of the magnetic head of the present invention that it includes an electrical heating element for the pole tip of the magnetic head, where the heating element is electrically interconnected with the induction coil electrical circuit of the magnetic head.

It is still another advantage of the magnetic head of the present invention that it includes an electrical heater for the pole tip of the magnetic head, where the number of electrical connections to the magnetic head is not increased.

It is an advantage of the hard disk drive of the present invention that it includes a magnetic head of the present invention wherein higher data writing rates utilizing a narrow pole tip are achieved.

It is another advantage of the hard disk drive of the present invention having a magnetic head of the present invention that it includes a narrow pole tip having an increased permeability.

It is a further advantage of the hard disk drive of the present invention having a magnetic head of the present invention that it includes a pole tip having lower stress.

It is yet another advantage of the hard disk drive of the present invention having a magnetic head of the present invention that it includes a heating element for the pole tip of the magnetic head.

It is yet a further advantage of the hard disk drive of the present invention having a magnetic head of the present invention that it includes an electrical heating element for the pole tip of the magnetic head, where the heating element is electrically interconnected with the induction coil electrical circuit of the magnetic head.

It is still another advantage of the hard disk drive of the present invention having a magnetic head of the present invention that it includes an electrical heater for the pole tip of the magnetic head, where the number of electrical connections to the magnetic head is not increased.

These and other features and advantages of the present invention will no doubt become apparent to those skilled in the art upon reading the following detailed description which makes reference to the several figures of the drawing.

IN THE DRAWINGS

The following drawings are not made to scale of an actual device, and are provided for illustration of the invention described herein.

DETAILED DESCRIPTION OF THE PREFERRED EMBODIMENTS

Figure 1:
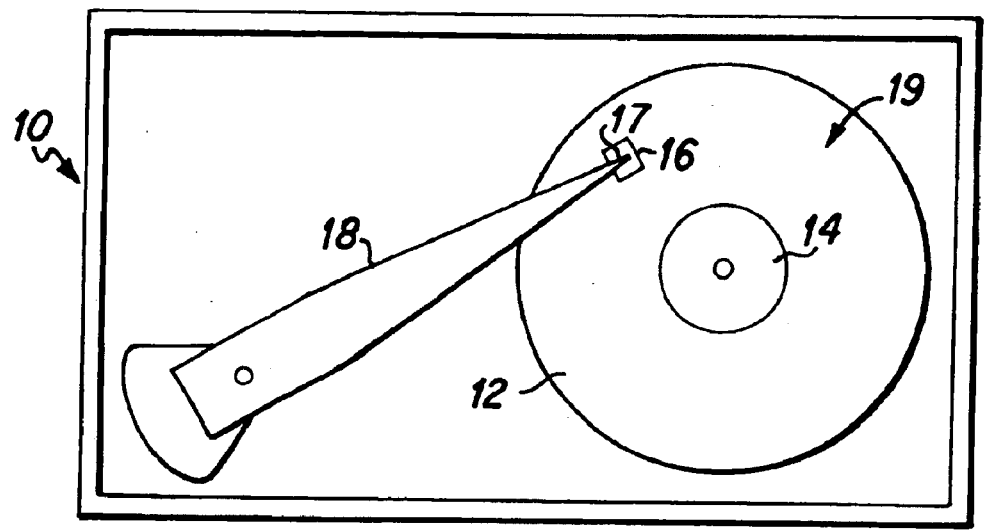
FIG. 1 is a schematic top plan view of a hard disk drive including the magnetic head of the present invention.

The magnetic head of the present invention is utilized to read and write data to magnetic media, such as a hard disk in a hard disk drive. A simplified top plan view of a hard disk drive 10 is presented in FIG. 1, wherein at least one magnetic media hard disk 12 is rotatably mounted upon a spindle 14. A magnetic head 16 of the present invention is formed upon a slider 17 that is mounted upon an actuator arm 18 to fly above the surface 19 of each rotating hard disk 12, as is well known to those skilled in the art. A typical hard disk drive 10 may include a plurality of disks 12 that are rotatably mounted upon the spindle 14, and a plurality of actuator arms 18, each having at least one slider 17 with a magnetic head 16 that is mounted upon the distal end of the actuator arms 18. As is well known to those skilled in the art, when the hard disk drive 10 is operated, the hard disk 12 rotates upon the spindle 14 and the slider acts as an air bearing in flying above the surface of the rotating disk. The slider 17 includes a substrate base upon which various layers and structures that form the magnetic head are fabricated. Such heads are fabricated in large quantities upon a wafer substrate and subsequently sliced into discrete magnetic heads 16.

Figure 2:
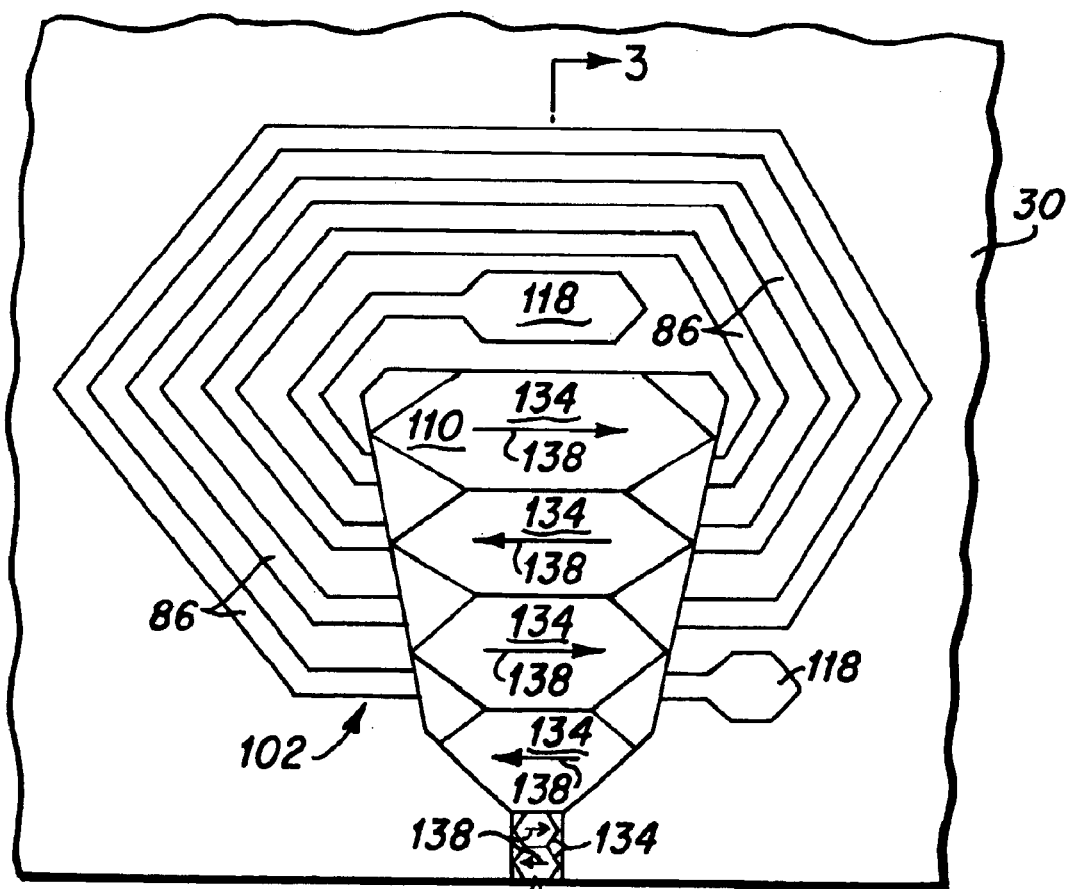
FIG. 2 is a top plan view depicting write head portions of a prior art magnetic head.
Figure 3:
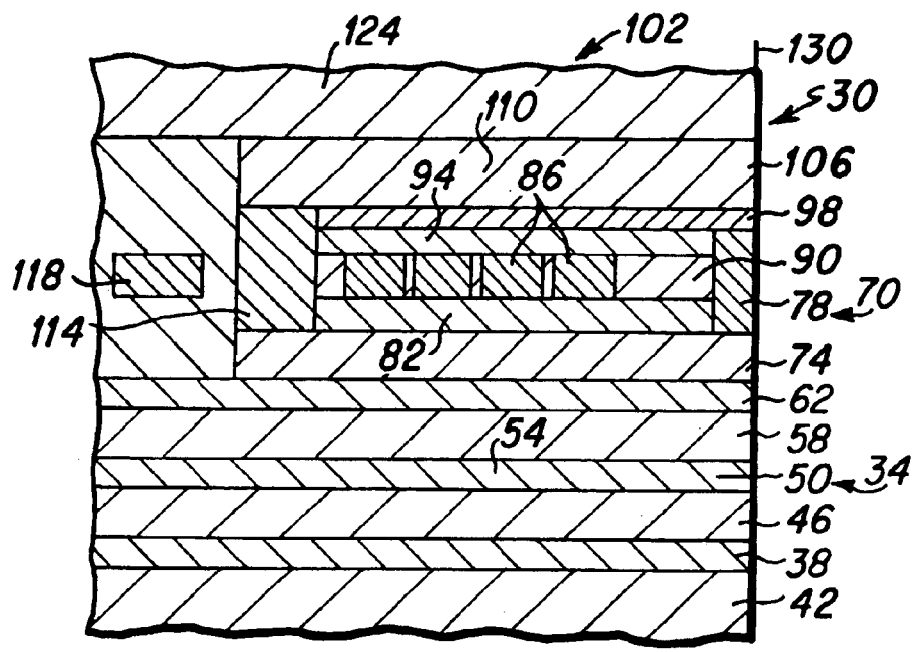
FIG. 3 is a side elevational view taken along lines 3—3 of FIG. 2.

To more fully describe the inventive features of the present invention, a prior art magnetic head is depicted in FIGS. 2 and 3, wherein FIG. 2 is a top plan view depicting components of the write head portion of the magnetic head and FIG. 3 is a side cross-sectional view taken along lines 3—3 of FIG. 2. As depicted FIGS. 2 and 3, and as will be well understood by those skilled in the art, the prior art magnetic head 30 basically includes a read head portion 34 (see FIG. 3) generally comprising an insulation layer 38 formed on a slider substrate surface 42, a first magnetic shield 46, a magnetoresistive sensor 50 formed within insulation layers 54, a second magnetic shield 58 and a further insulation layer 62. The write head components 70 of the magnetic head 30 generally include a first magnetic pole 74, a first magnetic pole pedestal 78, an insulation layer 82, an induction coil 86 that is formed on the insulation layer 82, filling insulation 90 between the coil turns 86, an insulation layer 94 formed on top of the induction coil turns, a write gap layer 98, a second magnetic pole structure 102 that includes a narrow pole tip portion 106 and a wide yoke portion 110, where a back gap element 114 magnetically interconnects the second magnetic pole yoke 110 with the first magnetic pole 74. Electrical interconnect contact pads 118 are fabricated to provide data writing electrical impulses to the induction coil 86, and the components of the magnetic head are subsequently encapsulated with a material such as alumina 124. The fabricated magnetic head is subsequently polished to create an air bearing surface (ABS) 130 that is disposed proximate the surface 19 of the magnetic disk 12 when the disk drive 10 is operated.

As will be well understood by those skilled in the art, the components and fabrication steps of a prior art magnetic head 30 are more complicated than described hereabove, however the preceding description is deemed sufficient to provide the necessary background for an understanding of the description of the present invention that is provided herebelow.

With reference to the second magnetic pole 102 depicted in FIG. 2, a generalized depiction of the magnetic domains 134 that are typically created within the yoke 110 and pole tip 106 are depicted. It can be seen that the magnetization (arrows 138) within the magnetic domains 134 is ideally parallel to the ABS 130, both throughout the yoke portion 110 and within the pole tip portion 106 of the second magnetic pole 102. When data is written using such a prior art magnetic pole, the magnetization 138 within the magnetic domains 134 rotates as magnetic flux flows through the head. The rotation switching rate generally is very rapid, and the magnetic pole 102 is capable of writing data at a high frequency. The significance of the magnetic domains 134 will become apparent in consideration of the more advanced magnetic head 150 depicted in FIG. 4 and next described.

Figure 4:
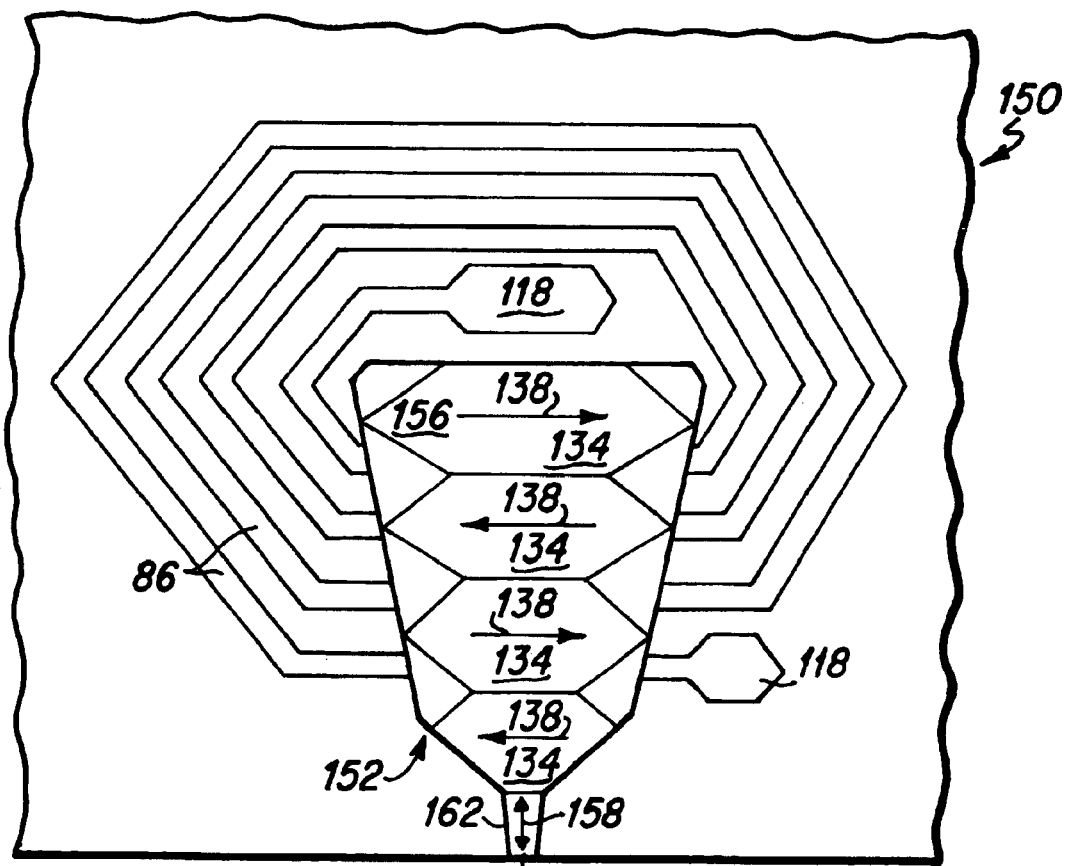
FIG. 4 is a top plan view of a write head portion of a magnetic head having a narrower write head pole tip than the device depicted in FIGS. 2 and 3.

FIG. 4 is a top plan view depicting a magnetic head design 150 that is similar to the magnetic head 30 depicted in FIG. 2. The head 150 includes a second magnetic pole 152 having a pole tip 154 and a yoke 156, with the difference being that the width of the pole tip 154 of the magnetic head 150 depicted in FIG. 4 is narrower than the width of the pole tip 106 of the head 30 depicted in FIG. 2. As efforts have been made to increase the areal data storage density of disk drives, such that a greater number of tracks per inch can be written on the media, the width of the pole tip has necessarily been decreased. Where the pole tip width is approximately equal to 0.25 microns or less (as depicted in FIG. 4), the pole tip width becomes on the scale of the size of magnetic domains within the pole tip. Experimental evidence has shown that where the pole tip width is approximately equal to or even less than the size of magnetic domains, that the magnetization (arrows 158) and magnetic domains 162 within the pole tip 154 become oriented perpendicularly to the ABS 130, as shown in FIG. 4, rather than parallel to the ABS as depicted in FIG. 2 and discussed hereabove. The perpendicular orientation of the magnetization 158 within the pole tip has a negative effect on the magnetization switching speed of the pole tip 154, and experimental data indicates that the magnetization switching speed within the narrow pole tip can become significantly decreased. The small sub-domain dimensions of the pole tip 154 reduce the local permeability of the pole tip through stress-induced anisotropy, and through the relatively slow domain wall motion involved in the switching action, such that the pole tip appears to act more like a small hard magnet than a magnetically soft permeable material pole tip depicted in FIG. 2. Therefore, while it is desirable to decrease the pole tip width such that the TPI and areal data storage density of the disk drive is increased, it is also desirable to maintain and increase the data writing rate or magnetization switching speed of the pole tip. The present invention, as is next described, provides a way to increase the data writing rate of the narrow pole tip.

Figure 5:
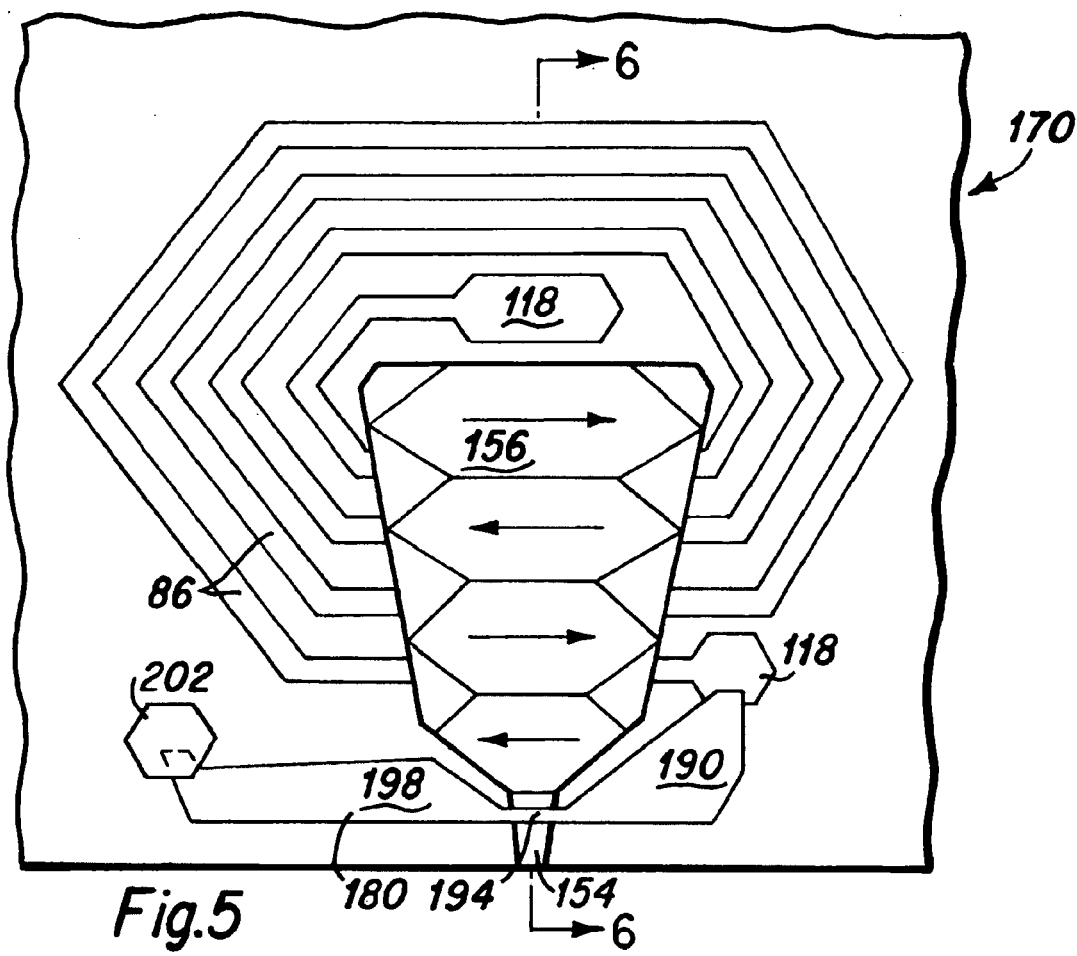
FIG. 5 is a top plan view of a write head portion of a magnetic head of the present invention.
Figure 6:
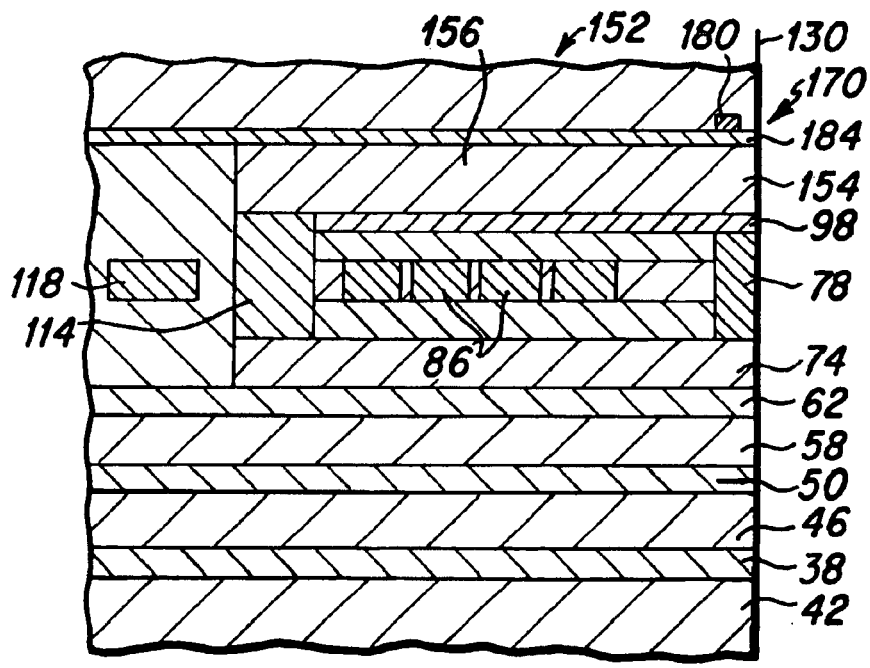
FIG. 6 is a side elevational view of the magnetic head of the present invention, taken along lines 6—6 of FIG. 5.

A first embodiment of the present invention is depicted in FIGS. 5 and 6, wherein FIG. 5 is a top plan view depicting components of the write head portion of a magnetic head 170 of the present invention that is suitable for use as the magnetic head 16 in the disk drive 10 depicted in FIG. 1, and FIG. 6 is a side cross-sectional view taken along lines 6—6 of FIG. 5. Initially, in comparing the head 170 depicted in FIG. 5 with that depicted in FIG. 4, it is to be noted that the second magnetic pole yoke 156 and pole tip 154 of the head 150 depicted in FIG. 4 is substantially identical to that utilized within the magnetic head 170 depicted in FIG. 5. Basically, the magnetic head 170 of the present invention, as depicted in FIGS. 5 and 6, includes a pole tip heating element 180 that is fabricated proximate the pole tip 154 to provide heat energy to the pole tip 154. It has been found that where the pole tip 154 is sufficiently heated, the permeability of the pole tip material is increased, pole tip stress is reduced and the magnetization switching rate of the pole tip 154 is increased.

As is best seen in FIG. 6, following the fabrication of the second magnetic pole 152 and its narrow pole tip 154, an electrical insulation layer 184, composed of a material such as alumina is deposited on top of the second magnetic pole 152. Thereafter, as is best seen in FIG. 5, a thin film heating element 180 is fabricated above and across the pole tip 154 and recessed from the ABS 130. The heater includes a first, relatively large electrical lead 190 that is fabricated in electrical connection with the induction coil pole interconnect contact pad 118 of the write head induction coil 86. A narrow pole tip heating portion 194 of the heater 180 is fabricated directly above the pole tip 154 and a relatively large electrical lead 198 is fabricated upon the other side of the pole tip from the first electrical lead 190. An induction coil electrical interconnect contact pad 202 is subsequently fabricated in electrical connection with the electrical lead 198. It is therefore to be understood that the pole tip heater element 180 is connected in series within the write head induction coil electrical circuit, such that the electrical current that passes through the induction coil 86 also passes through the heater element 180. Therefore, significantly, no additional electrical leads are required to be fabricated within the magnetic head 170 of the present invention in order to accomplish the heating of the pole tip 154.

Having understood the purpose and positioning of the heater element 180 of the present invention, those skilled in the art, with knowledge of state of the art fabrication methods for creating electrical leads and interconnects for the magnetoresistive sensors of the read head portion of magnetic heads will easily devise fabrication methods for the heater element. Basically, one fabrication method for the heater element can involve the deposition of a thin film heater element material layer comprised of a conductive material such as tungsten, copper, nickel iron, nickel chromium, IrRh, or other appropriate metals, upon the insulation layer 184. The thickness of the layer depends upon the properties of the material, such as its resistivity and the shape of the layer. For instance, for a thin film heater element layer comprised of tungsten, which in thin film form has a resistivity of about 10 micro ohm-cm, and assuming for simplicity that it has a square shape with 0.3 micron sides, to have a 0.5 ohm overall resistance, the thickness of the layer will be approximately 0.2 microns. Following the deposition of the heater element layer, a photoresist mask is fabricated to cover the footprint of the heater element 180, as depicted in FIG. 5, and an etching process is conducted to remove the exposed portions of the heater material layer. Thereafter, the photoresist is removed to leave the heater element 180 in the shape of the photoresist footprint, as depicted in FIG. 5.

Figure 7:
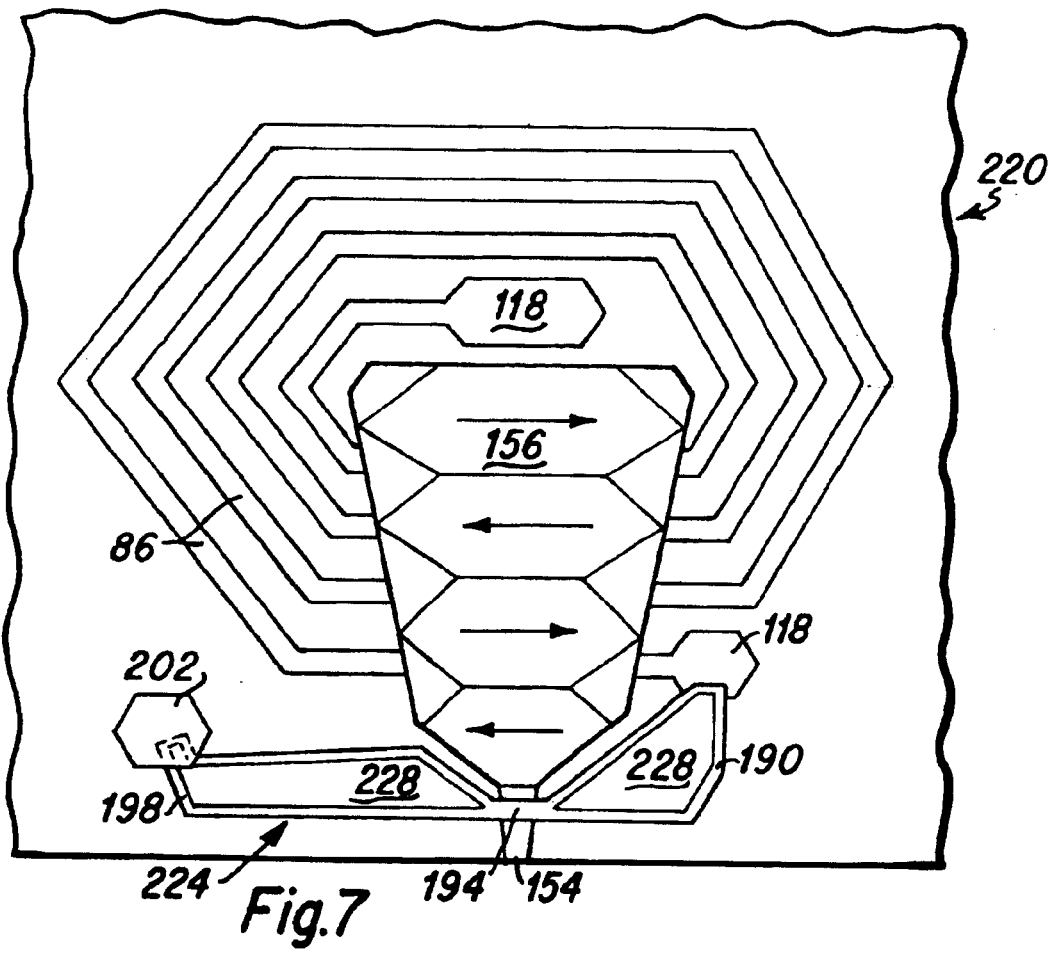
FIG. 7 is a top plan view depicting an alternative embodiment of the magnetic head of the present invention.

A first alternative embodiment 220 of the present invention is depicted in FIG. 7, which is a top plan view that is similar to FIG. 5. The heater element 224 depicted in FIG. 7 is an augmentation of the heater element 180 depicted in FIG. 5, wherein an additional thickness of electrically conductive material 228 is deposited upon the electrical leads 190 and 198 of the heater element 180 depicted in FIG. 5. The additional electrically conductive metal portions 228 serve to reduce the electrical resistance of the electrical leads of the heater element 224, such that the significant electrical resistance of the heater element 224 is even more localized at the narrow heating portions 194 above the pole tip. This results in a more efficient heating of the pole tip of the magnetic head 220.

Figure 8:
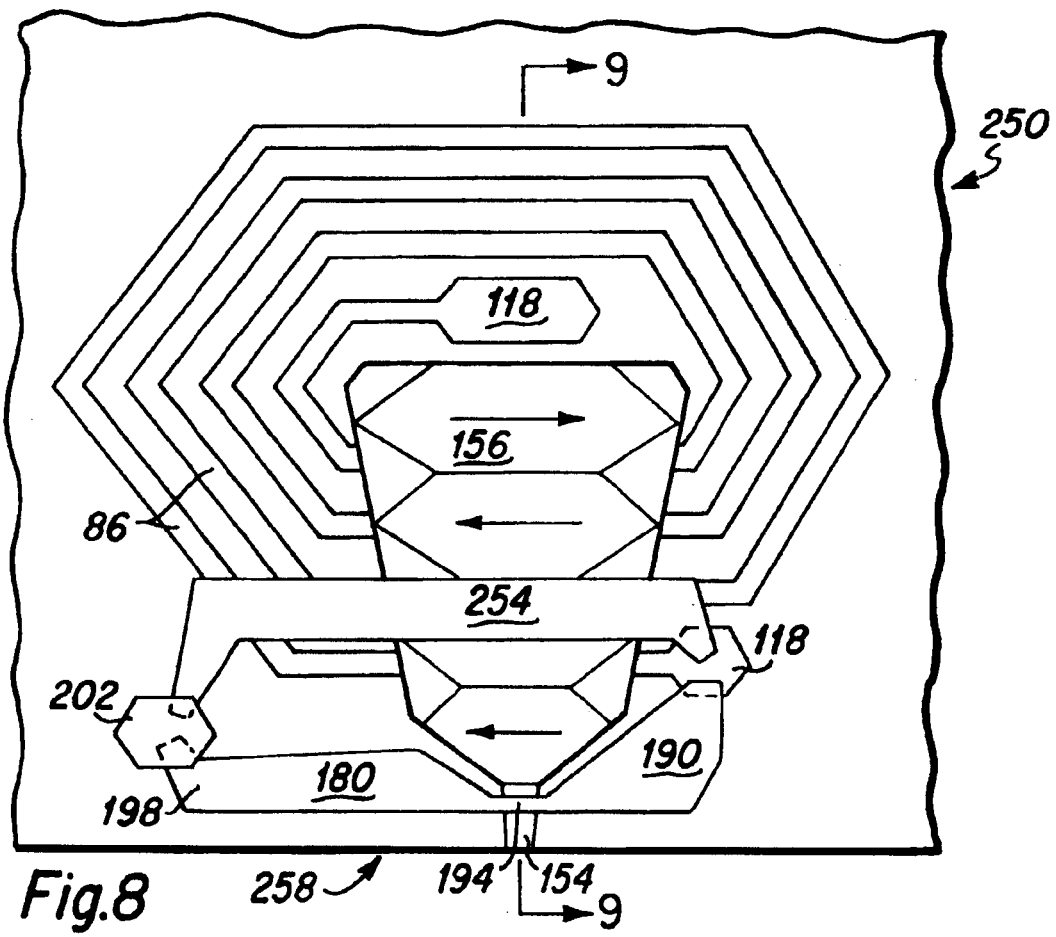
FIG. 8 is a top plan view depicting another alternative embodiment of the magnetic head of the present invention.
Figure 9:
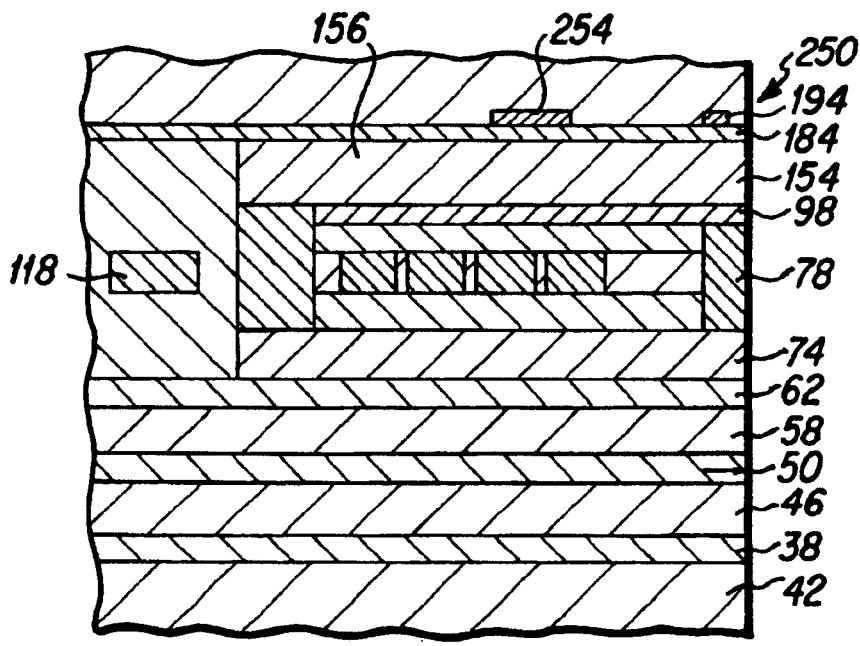
FIG. 9 is a side cross-sectional view of the magnetic head depicted in FIG. 8, taken along lines 9—9 of FIG. 8.

Another alternative embodiment 250 of the present invention is depicted in FIGS. 8 and 9, wherein FIG. 8 is a top plan view of the write head portion of the magnetic head 250, and FIG. 9 is a side cross-sectional view taken along lines 9—9 of FIG. 8. As depicted in FIGS. 8 and 9, and with reference to the embodiment of the present invention depicted in FIGS. 5 and 6, the significant difference between the embodiments 250 and 170 is the addition of a second electrically conductive leg 254 to the heating element 258 depicted in FIGS. 8 and 9. Basically, the additional leg 254 provides a second electrically conductive path. By controlling the width of the second leg 254, relative to the width of the heating element 194, the quantity of electrical current flowing through the heating element 194 is controlled, whereby the quantity of heat provided by the heating element 194 is likewise controlled. As can be seen in FIG. 9, both legs 180 and 254 of the heating element 258 are fabricated as thin films upon the insulation layer 184 above the second magnetic pole, and it is preferable that both legs 180 and 254 are fabricated in the same processing steps.

Figure 10:
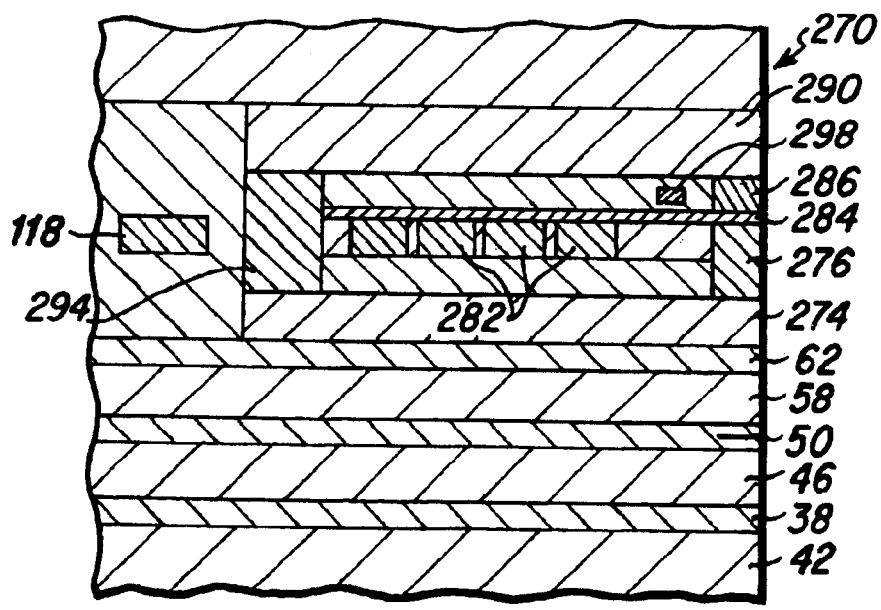
FIG. 10 is a cross-sectional view of a further alternative embodiment of the present invention.

FIG. 10 is a side cross-sectional view depicting yet another alternative embodiment 270 of the present invention. As depicted in FIG. 10, a first magnetic pole 274 is fabricated, followed by the fabrication of a first magnetic pole pedestal 276, followed by the fabrication of the induction coil 282, and followed by the deposition of a write gap layer 284. A separate second magnetic pole tip piece 286 is fabricated upon the write gap layer 284, and a magnetic pole yoke piece 290 is fabricated above the induction coil 282 to join the second magnetic pole tip piece 286 with a back gap 294 that magnetically interconnects the first magnetic pole 274 with the second magnetic pole yoke 290. Those skilled in the art will readily understand this generalized depiction and description of the magnetic head of FIG. 10. The significant addition of the present invention within the magnetic head 270 depicted in FIG. 10 is the additional fabrication of a heater element 298, similar to heater element 180 that is depicted in FIG. 5, immediately behind the P2 pole tip 286. The electrical leads of the heater element 298 are electrically connected in series with the electrical interconnects of the induction coil 282.

Desirable effects of the heater 180, 224, 258, 298 of the present invention are achieved with a relatively modest increase in the pole tip temperature of approximately 20° C. This increase in temperature is achievable where the heater element has a resistance of from approximately 0.2 to 1.0 ohms and preferably from approximately 0.3 to 0.6 ohms (where the induction coil generally has a resistance of 4 to 5 ohms), and where the induction coil current is approximately 40 mA, such that the heating energy of the heater is from approximately 0.3 to 1.6 mW and preferably approximately 0.5 mW. These requirements of the heater provide little impact upon the existing electrical parameters of the magnetic head; that is, the resistance of the induction coil circuit is increased approximately only 10% and the current in the induction coil is unchanged. It is recognized that the heating of the magnetic head pole tip will create some undesirable further protrusion of the head components at the ABS, however this additional protrusion is believed to be less than 0.6 nm, which is not considered to be significant where the typical protrusion of the head components caused by heating of the induction coil itself is approximately 3 nm. The heater of the present invention will provide stress relief within the pole tip of approximately 30–40 Megapascal, out of approximately 150 Megapascal stress that is typically present in an unheated narrow pole tip head. Additionally, the present invention desirably reduces the temperature rise time of the write head pole tip from above approximately 50 microseconds to approximately 10 microseconds. It can therefore be seen that the implementation of the heater element of the present invention involves minimal impact upon the fabrication and electrical circuit parameters of currently fabricated magnetic heads, while it will significantly increase the permeability of the pole tip, reduce stress within the pole tip, and ultimately provide an increase in the data writing rate at which the narrow pole tip magnetic head operates.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

We claim:

1. A magnetic head for a hard disk drive, comprising:
   a write head portion, including:
   a first magnetic pole;
   a second magnetic pole having a relatively large yoke portion and a narrow pole tip;
   an induction coil being disposed in part between said first magnetic pole and said second magnetic pole;
   a pole tip heating element being disposed proximate said pole tip for providing heat energy thereto, and wherein said heating element is electrically connected in series with said induction coil.

2. A magnetic head as described in claim 1 wherein said heating element is electrically connected in series with said induction coil, such that all electrical current that passes through said heating element also passes through said induction coil, and all electrical current that passes through said induction coil also passes through said heating element.

3. A magnetic head as described in claim 1 wherein said heating element includes a first electrical lead, a relatively narrow heating portion and a second electrical lead, and wherein said first electrical lead is electrically connected with an electrical interconnect contact pad of said induction coil.

4. A magnetic head as described in claim 3 wherein said heater portion of said heating element is comprised of a thin film material, and said electrical leads are comprised of one or more layers of electrically conductive material.

5. A magnetic head as described in claim 1 wherein a write gap layer is disposed between said first magnetic pole and said second magnetic pole tip, and wherein said heating element is disposed on a side of said pole tip that is away from said write gap layer, such that said pole tip is disposed between said write gap layer and said heating element.

6. A magnetic head as described in claim 1 wherein said heating element has an electrical resistance of approximately 0.2 to 1.0 ohms.

7. A magnetic head as described in claim 1 wherein the heating energy of the heating element is approximately 0.3 to 1.6 mW.

8. A magnetic head as described in claim 1 wherein said heating element includes at least two legs, wherein a first said leg provides heat energy to said pole tip and a second leg provides an alternative electrical path for electrical current passing through said heating element.

9. A magnetic head as described in claim 1, wherein a write gap layer is disposed between said first magnetic pole and said second magnetic pole yoke, and wherein said heating element is disposed between said write gap layer and said yoke.

10. A magnetic head as described in claim 1 wherein said heating element is comprised of a material selected from the group consisting of Cu, W, NiFe, NiCr and IrRh.

11. A hard disk drive including a magnetic head, comprising:
    at least one magnetic media disk;
    at least one actuating arm for holding the magnetic head;
    wherein the magnetic head includes:
    a write head portion, including:
    a first magnetic pole;
    a second magnetic pole having a relatively large yoke portion and a narrow pole tip;
    an induction coil being disposed in part between said first magnetic pole and said second magnetic pole;
    a pole tip heating element being disposed proximate said pole tip for providing heat energy thereto, and wherein said heating element is electrically connected in series with said induction coil.

12. A hard disk drive including a magnetic head as described in claim 11 wherein said heating element includes a first electrical lead, a relatively narrow heating portion and a second electrical lead, and wherein said first electrical lead is electrically connected with an electrical interconnect contact pad of said induction coil.

13. A hard disk drive including a magnetic head as described in claim 11 wherein a write gap layer is disposed between said first magnetic pole and said second magnetic pole tip, and wherein said heating element is disposed on a side of said pole tip that is away from said write gap layer, such that said pole tip is disposed between said write gap layer and said heating element.

14. A hard disk drive including a magnetic head as described in claim 13 wherein said write head portion further includes an induction coil being disposed in part between said first magnetic pole and said second magnetic pole and wherein said heating element is electrically connected with said induction coil.

15. A hard disk drive including a magnetic head as described in claim 11 wherein said heating element has an electrical resistance of approximately 0.2 to 1.0 ohms.

16. A hard disk drive including a magnetic head as described in claim 11 wherein the heating energy of the heating element is approximately 0.3 to 1.6 mW.

* * * * *